US008775244B2

(12) United States Patent
Boss et al.

(10) Patent No.: US 8,775,244 B2
(45) Date of Patent: Jul. 8, 2014

(54) OPTIMAL SCHEDULING OF VENUE ATTENDANCE BASED ON QUEUE SIZE AND LOCATION

(75) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 12/942,431

(22) Filed: Nov. 9, 2010

(65) Prior Publication Data
US 2012/0116863 A1    May 10, 2012

(51) Int. Cl.
*G06Q 30/00* (2012.01)

(52) U.S. Cl.
USPC .............. 705/14.19; 705/14.64; 705/14.58; 705/5

(58) Field of Classification Search
USPC .............. 707/104.1; 705/5, 10, 14.19, 14.64, 705/14.58; 340/5.21
See application file for complete search history.

(56) References Cited

U.S. PATENT DOCUMENTS

| 5,502,806 | A  |   | 3/1996  | Mahoney et al.       |
|-----------|----|---|---------|----------------------|
| 6,889,098 | B1 | * | 5/2005  | Laval et al. ... 700/19 |
| 7,114,647 | B2 |   | 10/2006 | Giraldin et al.      |
| 7,137,899 | B2 |   | 11/2006 | Hiei                 |
| 7,400,932 | B2 |   | 7/2008  | Ackley et al.        |
| 7,541,926 | B2 |   | 6/2009  | Dugan et al.         |
| 8,082,165 | B2 | * | 12/2011 | Natsuyama et al. ... 705/5 |
| 2002/0116235 | A1 | * | 8/2002  | Grimm et al. ... 705/5 |
| 2002/0167408 | A1 | * | 11/2002 | Trajkovic et al. ... 340/573.1 |

(Continued)

FOREIGN PATENT DOCUMENTS

| JP | 2003058922 A | 2/2003 | |
| WO | WO 2007004047 | * 6/2013 | ............. G06Q 10/00 |

OTHER PUBLICATIONS

Stefania Bandini, Mizar Luca Federici, Sara Manzoni, A Qualitative Evaluation of Technologies and Techniques for Data Collection on Pedestrians and Crowded Situations, Complex Systems and Artificial Intelligence Research Center, University of Milan, Biocca, Italy, ISBN# 1-56555-316-0, 2007, pp. 1057-1064.

(Continued)

*Primary Examiner* — Michael Bekerman
(74) *Attorney, Agent, or Firm* — Patrick J. Daugherty; Driggs, Hogg, Daugherty & Del Zoppo Co., LPA

(57) ABSTRACT

Embodiments of the invention provide for managing attraction attendance levels through tracking current attendance levels and notifying patrons of incentives to alter their attraction selections in real-time. Examples identify an attraction queue that has a customer wait time failing to meet a threshold and determine a geographic relationship of a tracking device associated with a registered customer to the queue. Accordingly, an incentive is created from metadata associated with the queue and offered to the registered customer to urge the registered customer to take a queue balancing action. The queue balancing action may be leaving the queue if the customer wait time exceeds a threshold maximum wait time and the tracking device is within the queue, or choosing to enter the queue if the customer wait time is less than a threshold minimum wait time and the tracking device is outside of the queue.

17 Claims, 3 Drawing Sheets

(56) References Cited

U.S. PATENT DOCUMENTS

| | | | |
|---|---|---|---|
| 2003/0102956 A1* | 6/2003 | McManus et al. | 340/5.2 |
| 2003/0177058 A1* | 9/2003 | Needham | 705/10 |
| 2004/0100390 A1 | 5/2004 | Giraldin et al. | |
| 2007/0142065 A1 | 6/2007 | Richey et al. | |
| 2007/0168390 A1* | 7/2007 | Mardirossian | 707/104.1 |
| 2008/0129487 A1 | 6/2008 | Crucs | |
| 2009/0313062 A1* | 12/2009 | Natsuyama et al. | 705/14.1 |
| 2009/0319306 A1 | 12/2009 | Chanick | |
| 2010/0117790 A1* | 5/2010 | Bayne et al. | 340/5.21 |
| 2012/0010923 A1* | 1/2012 | Yarmolich | 705/14.64 |

OTHER PUBLICATIONS

Peter Batty, Sentient Computing: From Graphical User Interface to Geographical User Interface, Crossing Boundaries, Conference Proceedings, Geospatial Information & Technology Association, Denver, Colorado, Mar. 2005, pp. 1-10.

* cited by examiner

OPTIMAL SCHEDULING OF VENUE ATTENDANCE BASED ON QUEUE SIZE AND LOCATION

BACKGROUND

The present invention relates to managing patron queues through influencing patron behaviors by incentives.

More particularly, elements within pubic attractions, such as amusement park rides, museum items, historical sites, etc., often require queues and other limited access strategies to enable each patron to have a turn at enjoying the attraction. Queue sizes, which may refer to numbers of patrons or time to serve each patron in the queue (i.e., how long the last person in the queue must wait to be served at the front of the queue) may have fluxes and lulls in the numbers of attending patrons, and thus in corresponding long or short wait times. Long wait times are generally undesired, and may result in customer dissatisfaction and corresponding loss of customer participation and revenue.

Venue operators sometimes implement preferential admission policies with respect to some customers, for example in order to enable quicker access to the more popular attractions for such preferred customers in order to increase their satisfaction. However, such techniques generally leave other customers dissatisfied. Further, such preferential admission policies are generally implemented at the time of providing admission status credentials to a customer upon entering a facility, and usually require estimating or extrapolating likely customer wait times in the future from current attendance, weather, past attraction and crowd behavior history, etc. As customer participation and attendance levels may fluctuate during a period that the attraction is available, for example over a day or over a weekend, the efficacy of such policies is limited by the ability to accurately project future attraction demands. Such policies also fail to adjust to new attendance data, for example to react or otherwise recognize that some attractions may become unexpectedly popular, or unexpectedly under utilized, after differentiated credentials have already been issued.

BRIEF SUMMARY

In one embodiment, a method is provided for managing attraction attendance levels through tracking current attendance levels and notifying patrons of incentives to alter their attraction selections in real-time. The method includes identifying an attraction queue that has a customer wait time failing to meet a threshold and determining a geographic relationship of a tracking device associated with a registered customer to the queue. Accordingly, the method creates an incentive from metadata associated with the queue and offers the incentive to the registered customer to urge the registered customer to take a queue balancing action. The queue balancing action may be leaving the queue if the customer wait time exceeds a threshold maximum wait time and the tracking device is determined to be within the queue, or choosing to enter the queue if the customer wait time is less than a threshold minimum wait time and the tracking device is determined to be outside of the queue.

In another embodiment, a computer system includes a processing unit, computer readable memory and a computer readable storage system. Program instructions on the computer readable storage system cause the processing unit to identify an attraction queue that has a customer wait time failing to meet a threshold and determine a geographic relationship of a tracking device associated with a registered customer to the queue. Accordingly, the program instructions are further to create an incentive from metadata associated with the queue and offer the incentive to the registered customer to urge the registered customer to take a queue balancing action. The queue balancing action may be leaving the queue if the customer wait time exceeds a threshold maximum wait time and the tracking device is determined to be within the queue, or choosing to enter the queue if the customer wait time is less than a threshold minimum wait time and the tracking device is determined to be outside of the queue.

In another embodiment, a computer program product includes program instructions to automatically select optimal fetch settings for each of a plurality of business processes as a function of database query load and relational context. The program instructions are to identify an attraction queue that has a customer wait time failing to meet a threshold and determine a geographic relationship of a tracking device associated with a registered customer to the queue. Accordingly, the program instructions are further to create an incentive from metadata associated with the queue and offer the incentive to the registered customer to urge the registered customer to take a queue balancing action. The queue balancing action may be leaving the queue if the customer wait time exceeds a threshold maximum wait time and the tracking device is determined to be within the queue, or choosing to enter the queue if the customer wait time is less than a threshold minimum wait time and the tracking device is determined to be outside of the queue.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
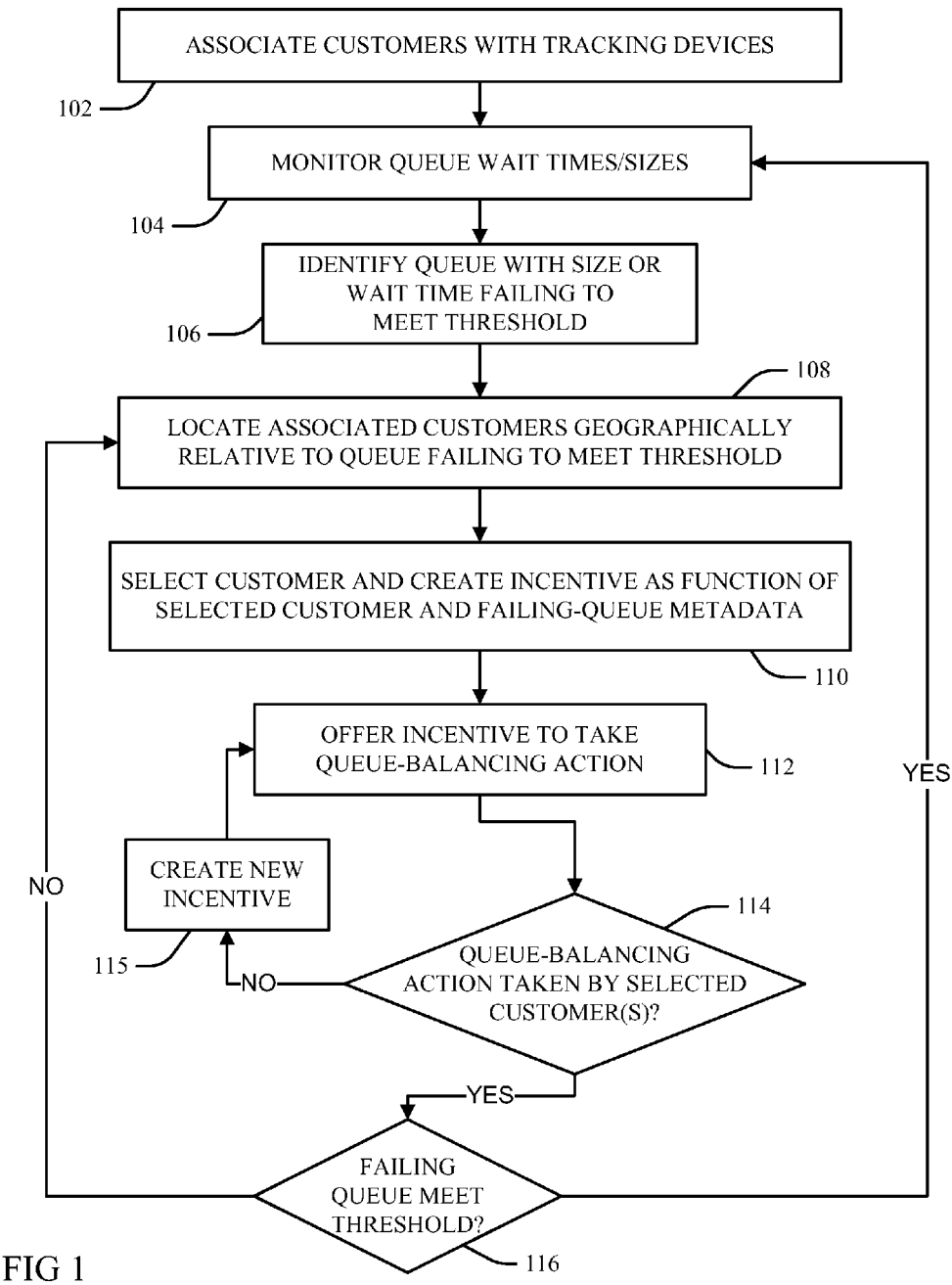
FIG. 1 provides a block diagram of a process or method according to the present invention for managing attraction attendance levels through tracking current attendance levels and notifying patrons of incentives to alter their attraction selections in real-time.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example but not limited to,an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 provides an illustration of a process or method for managing attraction attendance levels through tracking current attendance levels and notifying patrons of incentives to alter their attraction selections in real-time. At 102 a user is associated with a registered tracking/notification device. Examples of such tracking/notification devices include a device incorporating global positioning satellite (GPS), radiofrequency identification tag (RFID) and cellular telephone components that enable automated position tracking in real-time. Such devices or components may be issued by an attraction operator or manager, or they may be customer provided devices (for example, a personal cell phone) that is registered by an automated tracking system of the attraction operator or manager. Multiple devices or components may also be utilized, for example tracking may be achieved through one device (for example, an RFID bracelet) and notifications to the tracked customer may be achieved by a second, different device (for example, the customer's cellular-phone).

At 104 the attractions manager monitors customer wait times and/or other queue size attributes (numbers of patrons, etc.) at each of the plurality of attractions, and at 106 identifies at least one attraction that has a customer wait time or queue size attribute outside of a threshold value or range of values. Thus, a threshold range may indicate a lower minimum wait time indicative of a minimum customer usage level below which an attraction may be considered to be underutilized, and an upper maximum wait time at which customer dissatisfaction is likely to result, or at which attraction overuse or area overcapacity is indicated.

Utilizing the associated tracking device or component, the attraction operator locates customers geographically at 108 in real-time relative to the queue failing to meet the threshold an attraction area. The attraction tracking application may make the determination in response to identifying the queue outside the threshold at 106, or also continuously locate the tracked customer with respect to mapped attraction and facility data, thereby determining which attraction lines they may be in or facilities they may be availing themselves of (for example, restaurants, hotels, picnic areas, swimming pool areas, concourses and promenades, etc.), or proximities thereto.

At 110 a customer is selected and incentive created appropriate to the context of the queue or queues to be balanced, and optionally tailored uniquely to the customer, in order to encourage the customer to alter his present location or activity participation, for example to remove himself from (unselect) participation in an over utilized, crowded attraction and/or to select an underutilized facility. At 112 the customer is notified of the incentive. Thus, for an attraction with a long line, a text communication may be sent to a customer within the line (for example, through email, instant message, chat, automated phone message, etc.) with a time-dependent offer (for example, incorporating a countdown timer widget, an expiration time, etc.) to respond and take advantage of or otherwise comply with the offering. Examples include offering a time-dependent discount at a concession stand, store, another attraction admission price, or a premium pass to enter a shorter attraction line that encourages the customer to leave a current oversubscribed area or attraction.

At 114 acceptance or rejection of the offer by the customer is recognized, through tracking real-time movement of the customer and noting a change in venue, and/or through a customer notification (for example, the customer could enter an acceptance entry in an interactive device, pressing "Yes" or "No" or some other input (e.g. pressing 1 to accept or 2 to decline on a number keypad), or by replying with a text or chat message, or through some other method. If the customer declines, or not customers enough accept, or a queue size remains outside of threshold performance, then a new (for example, better, higher value) incentive may be defined at 115 for use with another offer iteration at 112 to the same and/or other customers. New offers and incentives may thus be made responsive to the determined acceptance or refusal of the offer, as well as to current real-time conditions (for example, have enough customers accepted incentives to bring target queues within threshold compliance?)

At 116 the system or process reassess customer movements and attraction attendance balances in response to the accepted offers. If the queue still fails to meet the applicable threshold, then another iteration of locating associated customers and making offers to take queue-balancing actions is indicated at 108. If instead the queue now meets the applicable threshold, then the process returns to general queue monitoring at 104.

Different customers may receive similar or different offers, in one aspect with offers subsequent to offers causing deficient queue balancing actions including higher incentives. Further, accepted offers may have terms changed, for example benefits increased to encourage continued acceptance and movement toward an alternative attraction, or benefits reduced or time limits reduced if too many people have accepted an offer. Thus, in one aspect offer, terms may be dynamic and conditional, with an accepting customer agreeing to a diminishing value as time elapsed to take a requested action increases, for example a 15% discount for the next five minutes or until a monitored queue size drops to a certain threshold, which becomes 10% for a subsequent five minutes or until a drop to a next threshold, etc.

Figure 2:
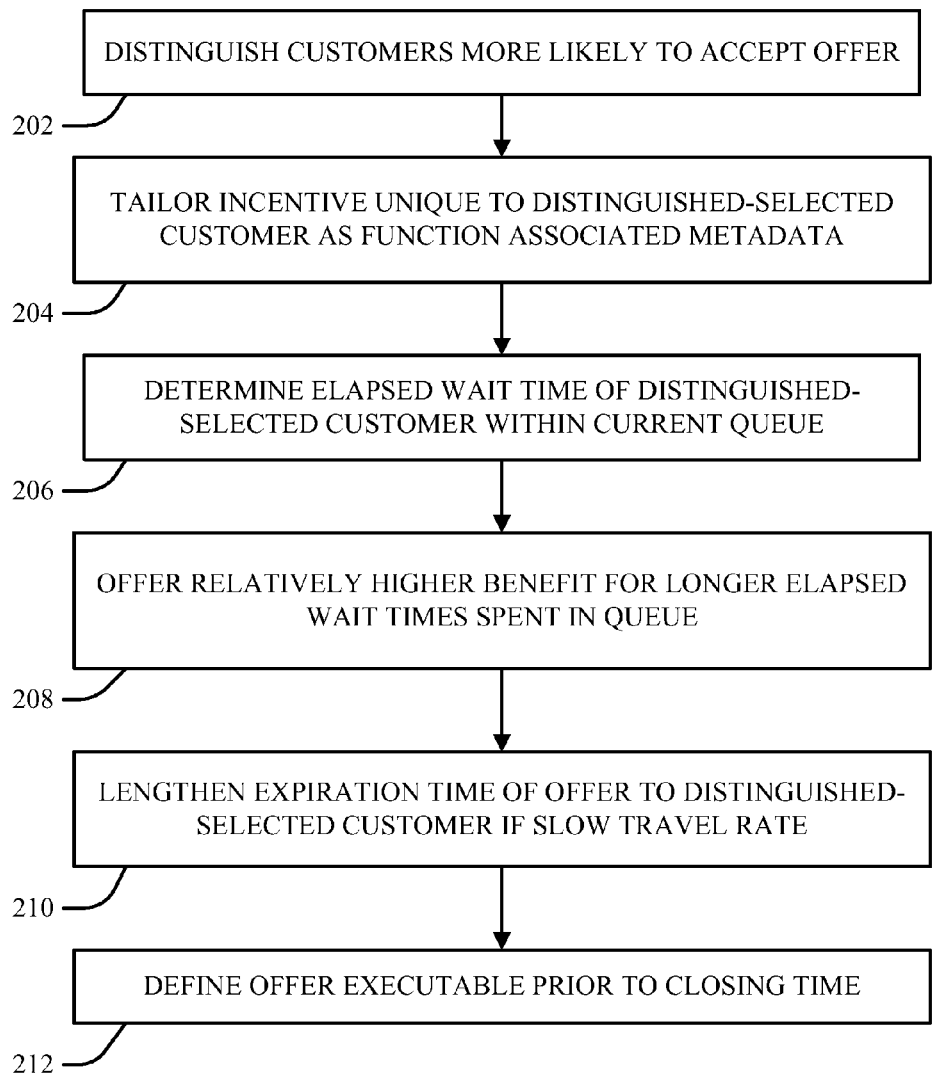
FIG. 2 is a block diagram of a process or method for defining offers and incentives for queue-balancing actions according to the present invention.

FIG. 2 is a block diagram illustration of exemplary processes or methods for defining offers and incentives for queue-balancing actions according to the present invention. Incentives may be tailored to individual customers. For example, customer metadata may be examined or mined for type or status of customer for use in formulating an offer, as well as to determine a likelihood that the customer will elect to use the offer and distinguish more or most likely customers to accept for proffering of offers at 202. Some offers may be specific to target demographic group members at 204, for example, targeted by age, gender, income, organizational affiliation, geographic domicile, etc. Thus, a youth may be offered a token to a video game, and an adult may be offered a free coffee coupon.

Offers may also account for mass crowd behavior, for example limiting the number of offers in a given queue to prevent an unwanted large exodus from the queue. In one embodiment, offers may be graduated within the same queue, having different time limits or offer terms. Offers may also be graduated or dependent upon subset locations within a specific area or line. For example, relative elapsed times spent in a queue may be determined at 206, with higher benefits offered for leaving a queue to those who have been waiting in a current queue the longest. Thus, a discount could be offered to a user near the end of a long queue to go to a nearby concession stand and receive 5% off their purchase at that concession stand, wherein someone towards the front of that line (therefore, one who has already invested time in waiting for the attraction) may receive a higher 15% discount if they leave the line and engage in the same nearby concession stand.

For under utilized attractions, broadcasts may be made to users proximate or generally near an attraction to inform them of the present condition of reduced wait times, and also to optionally offer additional incentives (for example, a discount redeemable at a concession stand for the rest of the day if you avail yourself of the underutilized attraction). Such broadcasts may also be made to those more distant from an attraction, in order to encourage future attendance, allowing for travel time to the attraction, and further to influence future queues (for example, broadcasting incentives available in the afternoon to customers in the morning). Likely travel rate of a customer may also be determined as a function of age or other demographic of the customer; in one aspect the expiration time of an offer may be extended at 210 for those with a slower travel rate than other customers (for example, elderly, very young children, physically handicapped, etc.), in order to help them get to the offered attraction prior to expiration of the offer.

Closing and opening times of the park or individual attractions may also be considered. For example, offers may be limited or otherwise defined at 212 to attractions that are proximate enough to a customer that it may be chosen and enjoyed prior to a closing time of the park, thus to ensure that the offer may be enjoyed or otherwise usable by a customer prior to a closing time of the facility of attraction. Customers might not receive incentives to choose an attraction in the afternoon that is historically more popular toward the end of the day, such incentives limited instead to historic low-attendance time periods.

Some amusement parks offer limited numbers of premium passes that entitle users to enter special lines with shorter wait times, while other users must queue in general lines having longer wait times to use the same attractions. According to the present invention, a customer may be offered such a special pass if he alters his behavior, perhaps leaving an over-utilized line now and wherein the special pass may be used at this attraction at or after a specified later time, or at another popular attraction if used after a specified later time or before a currently-defined expiration time. Offers may also be conditional upon exiting a current line/area within the time or another time, in one aspect providing confirmation of selection of the offer through real-time mapping of the customer movements.

Thus, the present invention allows for addressing real-time fluxes and lulls in numbers of people attending attractions through a real-time feedback process, wherein incentives may be dynamically created, offered or terminated contemporaneously with current queue sizes and balancing, and which may have immediate effects in reducing current long wait times or rebalancing shorter wait times to result in better resource allocations and customer satisfaction.

In one aspect, customers may also be made generally aware of over or underutilized balancing attractions, wherein the location of the notified customer may not be considered. However, embodiments that focus on customers in a specified queue or vicinity may be expected to more efficiently and rapidly effect queue size changes, in one aspect as such customers may be more likely to accept an offer to leave a long line, or to divert those nearby before they enter an oversubscribed queue or area.

Customers may also use their own GPS-enabled cell phone (or other GPS-enabled device) near attractions. In some embodiments, returnable or consumable GPS and/or RFID two-way communication devices, tokens or cards are issued to customers for tracking and/or communication. For example, wrist bands may be issued to patrons comprising RFID chips and, as the patron enters a queue for an attraction, their RFID tag is scanned by an antenna at the entry to the attraction. The RFID tag may also be subsequently scanned as they enter the ride with another RFID antenna scanner, which enables computation of actual, current queue times based on actual time stamps.

Current group status at admission to a facility may be considered: was admission through a single ticket, a family ticket (if so, how many in the family), or through a group sale to a large collective (for example, a school trip, a business or organization, etc.). For example, an entire group may be offered discounted cinema tickets for a specific show time wherein the venue may be expected to accommodate all members of the group receiving the offer. In one aspect, group identity may make all-or-none acceptance of an offer more likely, and thus projections of likely acceptance may consider group members as subsets of likely acceptors.

Type or status of customer may also include preferences, such as expressly noted by a customer (for example, at admission) or through metadata or intra or extra facility customer history. For example, a customer may self-designate herself as a roller coaster enthusiast, or historic attraction attendance (including that observed during the current day) may indicate roller coasters are preferred over other rides. Dining records may indicate dining preferences, such as carry-out vs. formal dining, or types of food and beverages (vegetarian, sushi, alcohol purchases, etc.)

Articles associated with a customer may also be noted, such as strollers for small children, skateboards, wheelchairs, bikes, boat marina admission, etc. Thus, a skate park admission discount may be offered for a skateboarder, or marina store discounts to one entering through a marina or boat dock.

Determination of appropriate incentives as well as the number of incentives offered may thus be fine tuned to customer metadata, in one aspect enabling targeting to those who would benefit the most and be most likely to accept, which may maximize an expected effective yield from an offer and minimize the number of offers that are made, resulting in savings by avoiding oversubscription to incentives that may reduce revenue for a provider. In another aspect, a low predicted yield with respect to some customers may allow a greater broadcast of the offer, the manager benefiting from creating good will with customers receiving an offer even if the customers elect not to accept the offer, and such good will may be created at little cost.

Figure 3:
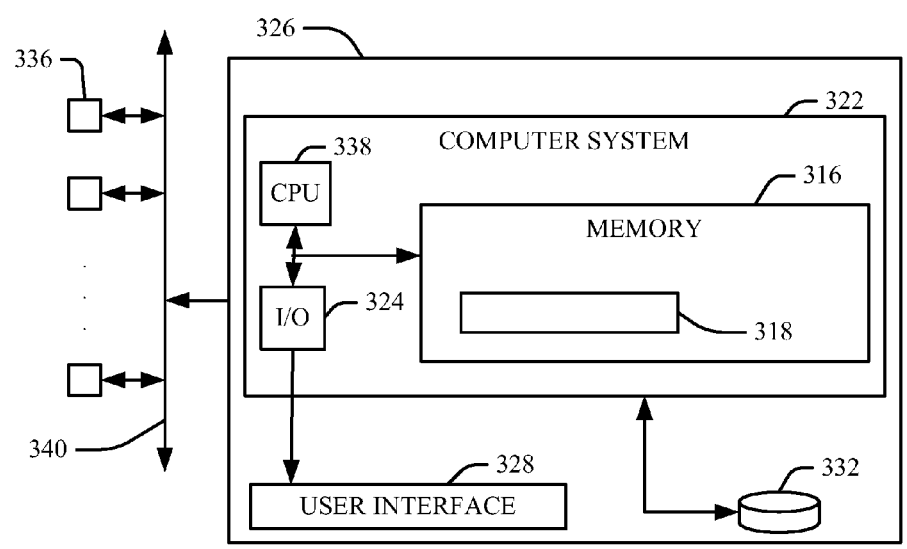
FIG. 3 is a computerized implementation of an embodiment of the present invention.

Referring now to FIG. 3, an exemplary computerized implementation of an embodiment of the present invention includes client computer or other programmable device 322 in communication with a user interface 328 and with one or more third party servers 336 accessible through an SSL or other secure web interface 340, for example in response to computer readable code 318 in a file residing in a memory 316 or a storage system 332 through a computer network infrastructure 326. The implementation is intended to demonstrate, among other things, that the present invention could be implemented within a network environment (e.g., the Internet, a wide area network (WAN), a local area network (LAN) or a virtual private network (VPN), etc.) Communication can occur via any combination of various types of communications links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 326 is intended to demonstrate that an application of an embodiment of the invention can be deployed, managed, serviced, etc. by a service provider who offers to implement, deploy, and/or perform the functions of the present invention for others.

The computer 322 comprises various components, some of which are illustrated within the computer 322. More particularly, as shown, the computer 322 includes a processing unit (CPU) 338 in communication with the memory 316 and with one or more external I/O devices/resources 324, user interfaces 328 and storage systems 332. In general, the processing unit 338 may execute computer program code, such as the code to implement one or more of the process steps illustrated in the Figures, which may be stored in the memory 316 and/or external storage system 332 or user interface device 328.

The network infrastructure 326 is only illustrative of various types of computer infrastructures for implementing the invention. For example, in one embodiment, computer infrastructure 326 comprises two or more computing devices (e.g., a server cluster) that communicate over a network. Moreover, the computer 322 is only representative of various possible computer systems that can include numerous combinations of hardware. To this extent, in other embodiments, the computer 322 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 338 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 324 can comprise any system for exchanging information with one or more of the external device 328. Still further, it is understood that one or more additional components (e.g., system software, math co-processing unit, etc.), not shown, can be included in the computer 322.

One embodiment performs process steps of the invention on a subscription, advertising, and/or fee basis. That is, a service provider could offer to manage attraction attendance levels through tracking current attendance levels and notify patrons of incentives to alter their attraction selections in real-time. In this case, the service provider can create, maintain, and support, etc., a computer infrastructure, such as the network computer infrastructure 326, that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles as described above. In this case, a computer infrastructure, such as the computer infrastructure 326, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 322/336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing attraction attendance levels through tracking current attendance levels and notifying patrons of incentives to alter their attraction selections in real-time, the method comprising:
   identifying a queue of an attraction of a plurality of attractions that has a customer wait time that exceeds a threshold maximum wait time;
   in response to identifying that the queue has the customer wait time that exceeds the threshold maximum wait time, a processor automatically:
   determining that a tracking device is associated with a registered customer and is located within the queue;
   creating, from metadata that is associated with the registered customer, an incentive comprising a discount redeemable at an alternative attraction of the plurality of attractions;
   offering, to the registered customer, the created incentive in association with an expiration time period; and
   conditioning acceptance of the offer upon determining that the registered customer exits the queue and redeems the discount at the alternative attraction prior to a lapse of the offer expiration time period.

2. The method of claim 1, wherein the creating the incentive further comprises:
   utilizing the metadata associated with the registered customer to distinguish the registered customer from other registered customers as more likely to accept the offered incentive and leave the queue; and
   tailoring the incentive as unique to the registered customer from the metadata associated with the registered customer, wherein the metadata associated with the registered customer comprises at least one of an age demographic, a historic preference and an article that is associated with the registered customer.

3. The method of claim 2, further comprising:
   recognizing that the registered customer has accepted or failed to accept the offer of the created incentive by:
   tracking movement of the tracking device associated with the registered customer relative to the queue; and
   comparing the tracked movement to an expected movement associated with leaving the queue.

4. The method of claim 3, further comprising, in response to recognizing that the registered customer has failed to accept the offer of the created incentive to leave the queue:
   creating an updated incentive comprising an increased benefit as a function of the metadata associated with the registered customer; and
   offering the updated incentive to the registered customer to re-urge the registered customer to leave the queue.

5. The method of claim 3, wherein the creating the incentive from the metadata associated with the registered customer and offering the incentive further comprises:
   determining a first location in the queue of the registered customer that is indicative of a first elapsed wait time that the registered customer has been waiting in the queue;
   determining a second location in the queue of another registered customer, wherein the second location is different from the first location, the second location is more near to an end of the queue than the first location, the second location is indicative of a second elapsed wait time that the another registered customer has been waiting in the queue, and the second elapsed time is less than the first elapsed wait time; and in response to determining that the second elapsed wait time is less than the first elapsed wait time, creating the incentive offered to the registered customer with an offered value, wherein the offered value is more beneficial than another offered value of another incentive that is offered to the another registered customer to leave the queue.

6. The method of claim 3, further comprising:

extending the expiration time for the offer as a function of a travel rate of the registered customer in response to an indication in the customer metadata that the registered customer is a child or an elderly person.

7. The method of claim 6, further comprising:

determining the expiration time for the offer to enable the registered customer to travel to an alternative queue of the alternative attraction and engage in an activity associated with the alternative attraction prior to a closing time of the alternative attraction.

8. A system, comprising:

a processor in communication with a computer readable memory and a tangible computer-readable storage medium;

wherein the processor, when executing program instructions stored on the tangible computer-readable storage medium via the computer readable memory, in response to a determination that a queue of an attraction of a plurality of attractions has a customer wait time that exceeds a threshold maximum wait time:

determines that a tracking device is associated with a registered customer and is located within the queue;

creates, from metadata associated with the registered customer, an incentive that comprises a discount redeemable at an alternative attraction of the plurality of attractions;

offers, to the registered customer, the created incentive in association with an expiration time period; and conditions acceptance of the offer upon determining that the registered customer exits the queue and redeems the discount at the alternative attraction prior to a lapse of the offer expiration time period.

9. The system of claim 8, wherein the processor, when executing the program instructions stored on the computer-readable storage medium via the computer readable memory, creates the incentive by:

utilizing the metadata associated with the registered customer to distinguish the registered customer from other registered customers as more likely to accept the offered incentive and leave the queue; and tailoring the incentive as unique to the registered customer from the metadata associated with the registered customer, wherein the metadata associated with the registered customer comprises at least one of an age demographic, a historic preference and an article that is associated with the registered customer.

10. The system of claim 9, wherein the processor, when executing the program instructions stored on the computer-readable storage medium via the computer readable memory, creates and offers the incentive to the registered customer by:

determining a first location in the queue of the registered customer that is indicative of a first elapsed wait time that the registered customer has been waiting in the queue;

determining a second location in the queue of another registered customer, wherein the second location is different from the first location, the second location is more near to an end of the queue than the first location, the second location is indicative of a second elapsed wait time that the another registered customer has been waiting in the queue, and the second elapsed time is less than the first elapsed wait time; and in response to determining that the second elapsed wait time is less than the first elapsed wait time, creating the incentive offered to the registered customer with an offered value, wherein the offered value is more beneficial than another offered value of another incentive that is offered to the another registered customer to leave the queue.

11. The system of claim 9, wherein the processor, when executing the program instructions stored on the computer-readable storage medium via the computer readable memory, extends the expiration time for the offer to the registered customer in response to an indication in the customer metadata that the registered customer is a child or an elderly person.

12. The system of claim 11, wherein the processor, when executing the program instructions stored on the computer-readable storage medium via the computer readable memory, determines the expiration time for the offer to the registered customer to enable the registered customer to travel to an alternative queue of the alternative attraction and engage in an activity associated with the alternative attraction prior to a closing time of the alternative attraction.

13. A computer program product for managing attraction attendance levels through tracking current attendance levels and notifying patrons of incentives to alter their attraction selections in real-time, the computer program product comprising:

a tangible computer readable storage hardware device having computer readable program code embodied therewith, the computer readable program code comprising instructions that, when executed by a computer processor, cause the computer processor to, in response to a determination that a queue of an attraction of a plurality of attractions has a customer wait time that exceeds a threshold maximum wait time:

determine that a tracking device is associated with a registered customer and is located within the queue;

create, from metadata associated with the registered customer, an incentive that comprises a discount redeemable at an alternative attraction of the plurality of attractions;

offer, to the registered customer, the created incentive in association with an expiration time period; and condition acceptance of the offer upon determining that the registered customer exits the queue and redeems the discount at the alternative attraction prior to a lapse of the offer expiration time period.

14. The computer program product of claim 13, wherein the computer readable program code instructions, when executed by the computer processor, further cause the computer processor to create the incentive by:

utilizing the metadata associated with the registered customer to distinguish the registered customer from other registered customers as more likely to accept the offered incentive and leave the queue; and tailoring the incentive as unique to the registered customer from the metadata associated with the registered customer, wherein the metadata associated with the registered customer comprises at least one of an age demographic, a historic preference and an article that is associated with the registered customer.

15. The computer program product of claim 14, wherein the computer readable program code instructions, when executed by the computer processor, further cause the computer processor to create and offer the incentive to the registered customer by:
- determining a first location in the queue of the registered customer that is indicative of a first elapsed wait time that the registered customer has been waiting in the queue;
- determining a second location in the queue of another registered customer, wherein the second location is different from the first location, the second location is more near to an end of the queue than the first location, the second location is indicative of a second elapsed wait time that the another registered customer has been waiting in the queue, and the second elapsed time is less than the first elapsed wait time; and
- in response to determining that the second elapsed wait time is less than the first elapsed wait time, creating the incentive offered to the registered customer with an offered value, wherein the offered value is more beneficial than another offered value of another incentive that is offered to the another registered customer to leave the queue.

16. The computer program product of claim 14, wherein the computer readable program code instructions, when executed by the computer processor, further cause the computer processor to extend the expiration time for the offer to the registered customer in response to an indication in the customer metadata that the registered customer is a child or an elderly person.

17. The computer program product of claim 16, wherein the computer readable program code instructions, when executed by the computer processor, further cause the computer processor to determine the expiration time for the offer to the registered customer to enable the registered customer to travel to an alternative queue of the alternative attraction and engage in an activity associated with the alternative attraction prior to a closing time of the alternative attraction.

* * * * *